United States Patent [19]
Jureit

[11] 3,841,195
[45] Oct. 15, 1974

[54] TWO-SIDED FASTENER
[75] Inventor: John Calvin Jureit, Coral Gables, Fla.
[73] Assignee: Automated Building Components Inc., Miami, Fla.
[22] Filed: May 15, 1973
[21] Appl. No.: 360,600

[52] U.S. Cl.................. 85/13, 29/432, 52/753 L
[51] Int. Cl................. A43b 23/20, F16b 15/00
[58] Field of Search................ 29/432, 432.1, 432.2;
227/26; 156/92; 85/14, 13, 11; 52/758 D,
758 B, 753 L

[56] References Cited
UNITED STATES PATENTS
| 826,125 | 7/1906 | Steinmetz | 85/14 X |
| 3,416,283 | 12/1968 | Sanford | 85/13 X |
| 3,417,652 | 12/1968 | Menge | 52/753 L X |
| 3,454,292 | 7/1969 | Sanford | 85/14 X |

FOREIGN PATENTS OR APPLICATIONS
| 750,602 | 1/1967 | Canada | 85/13 |
| 365,302 | 12/1962 | Switzerland | 85/14 |

Primary Examiner—Charlie T. Moon
Attorney, Agent, or Firm—LeBlanc & Shur

[57] ABSTRACT

A novel method and apparatus is disclosed for the joining of two wooden structural members in which a connector plate assembly having teeth projecting from opposite sides thereof is placed between the members to be joined and the members forced thereon. The connector assembly includes back-to-back connector plates which are welded prior to assembly. The teeth projecting from either side of the assembly are arranged in longitudinal rows with selected teeth having scarfed tips for providing a clinching action. Other teeth are provided with chisel-pointed tips for resistance to shear. The rows of teeth are staggered and carry angled shoulder portions which provide the shank of each tooth with a widened base. Because of the staggering the slot left by each shoulder portion is adjacent the metal between adjacent teeth in an adjacent row thereby increasing the effective net section of the plates. The slots in the connector plates left when the teeth are struck from the plate are misaligned when the plates are welded together for permitting welding of the two plates together by the introduction of weldment into the slots. Selected teeth are made shorter than the remaining teeth to permit joint formation with reduced pressure.

13 Claims, 5 Drawing Figures

PATENTED OCT 15 1974  3,841,195
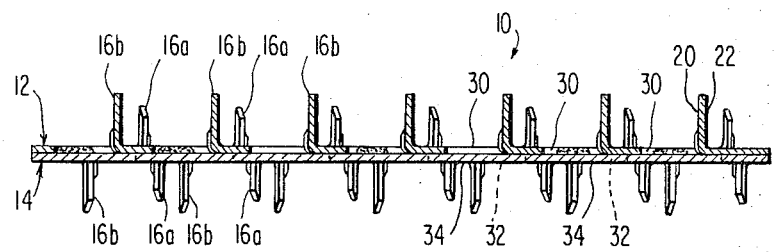
FIG.1
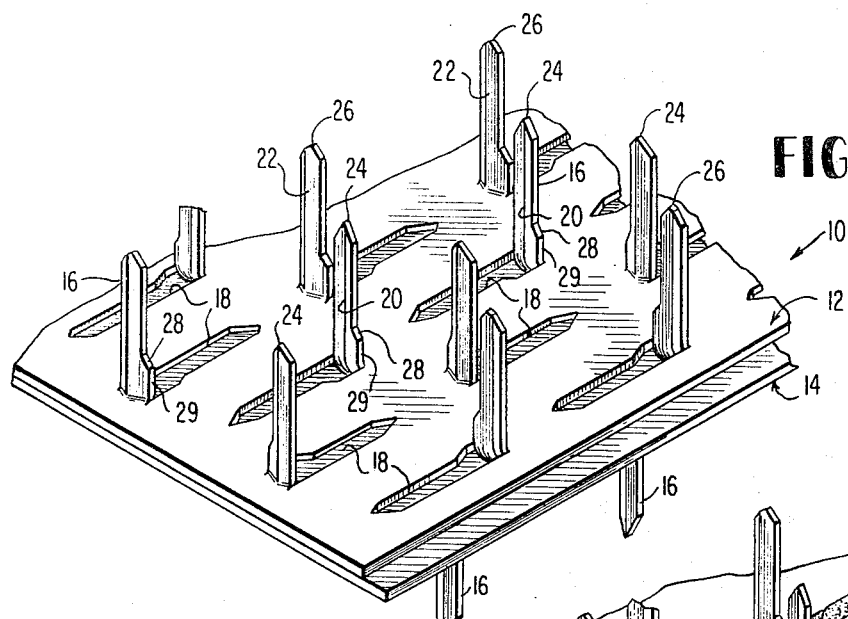
FIG.2
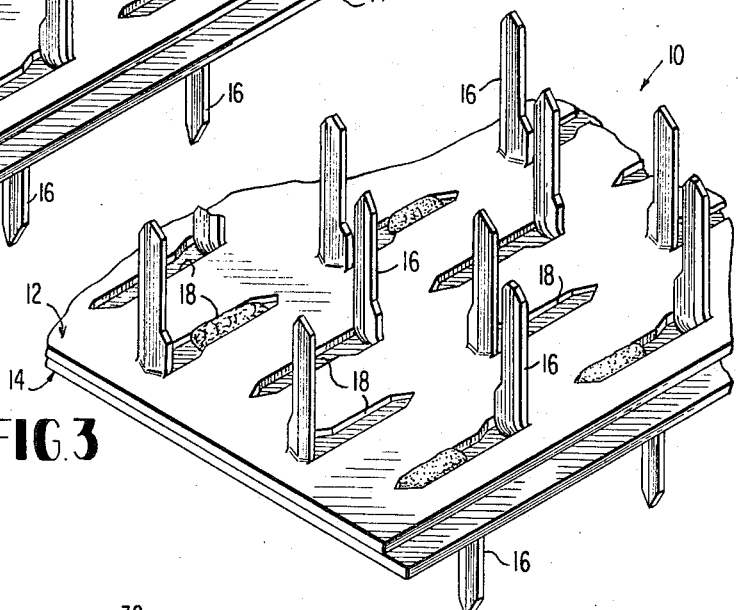
FIG.3
FIG.4
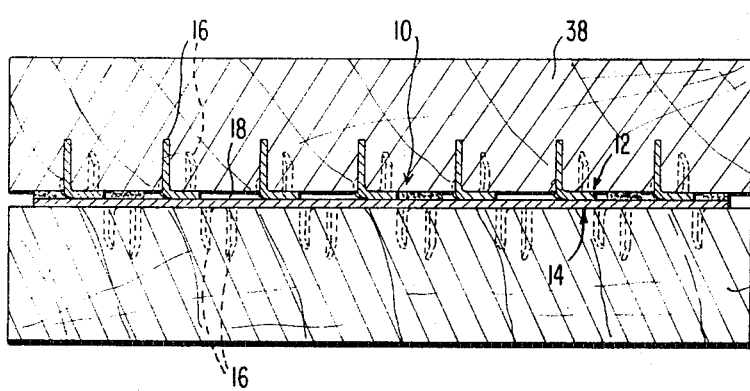
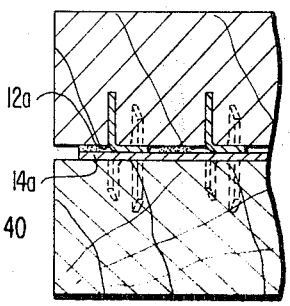
FIG 5

TWO-SIDED FASTENER

This invention relates to metal connectors and more particularly to hidden fasteners for connecting and joining wooden structural members in a laminating or abutting fashion.

While the use of metal connector plates having teeth protruding therefrom for joining wooden structural members is commonplace in the building construction arts for fabrication of wooden building frames, trusses and the like, the utilization of metal connectors in the fabrication of furniture presents certain problems. In the fabrication of furniture the structural members to be fastened provide less surface area than is common for wooden frames in building construction. The relative smallness of size of the furniture members to be joined prevents the use of either large connector plates or connector plates having a large number of nail-like protrusions or teeth.

Another critical difference between wooden frames utilized in building construction and the fabrication of furniture is the type of shear, torsional and compressive forces to which the structural members used in furniture are subjected. It will be appreciated that within the building arts the major forces operating are those produced by static forces. However, with respect to furniture fabrication, in addition to static forces, the joints are continually worked and the structural members are subjected to forces not usually associated with building structures. For instance the mere rocking back on the back legs of a chair produces a lever action which forces apart the pieces of a chair in a violent manner having no ready counterpart in building fabrication.

Heretofore, forces of the type encountered with furniture have required bolting, dowelling, keying and the use of adhesives in order to strengthen the furniture so that it can withstand certain abuse. Bolting and/or dowelling or keying is expensive and time consuming, also requiring a great deal of tooling.

It has been found that hidden fasteners such as those found in the prior art when used on furniture often fail during normal use of the furniture as well as during abuse, due to the limited contact area involved, withdrawal of fastener teeth, plate failure and fracture or shearing of the teeth.

In summary, because of the working of furniture and the limited contact area, hidden fasteners of the type in which teeth project into the wooden members have been impractical thereby precluding the substantial cost reductions associated with the use of such fasteners. Thus the formation or fabrication of furniture by the pressing together of two wooden structural members with a toothed connector plate assembly therebetween has been precluded.

The present invention solves these and other problems by the provision of a novel and improved metallic connector assembly intermediate wooden structural members prior to the compression of these members onto the connector assembly. The connector assembly includes substantially planar plates secured in back-to-back relation from which teeth are struck and depend outwardly in opposite directions from opposite sides of the connector assembly. On each plate, the teeth are arranged in longitudinal columns. Selected teeth in selected columns are provided with scarfed tips while other teeth are provided with chiselpointed tips. The scarfed tips when embedded in a wooden structural member provide a clinching function while the chisel-pointed teeth protect against shear forces. Selected teeth are given selected different lengths to permit ease of formation and fabrication. Each of the teeth is provided with a shank having a widened base portion to protect against shearing and fracture of the teeth during the working of the furniture. In order to give added plate stability and to protect against plate fracture, the effective net section of each plate is increased by the placing of the portion of the slot left by the widened shank of a tooth adjacent a metal portion of the plate between adjacent teeth in adjacent rows.

The slots in adjacent plates are misaligned such that a metal portion of one plate is exposed through a slot of an adjacent plate. Welding is accomplished by the forming of weldment in a slot which adheres to the exposed surface of the adjacent plate due to the misalignment.

Thus the welding of the two plates together provides an exceptionally strong interconnecting assembly such that plate failure is virtually eliminated. This is particularly important in considering the abuse to which furniture and especially four-legged furniture is put.

A prefabricated connector assembly of the type described thus provides a unique intermediate connecting member for use in the fabrication of furniture which is unusually resistant to the working of the furniture during use.

There do exist, of course, a number of connector plates and fasteners which have teeth projecting from one or both sides of a single plate. Such fasteners are exemplified by the devices illustrated in U.S. Pat. No. 2,877,520 issued to J. C. Jureit on Mar. 17, 1959; U.S. Pat. No. 3,472,118 issued to J. C. Jureit on Oct. 14, 1969; U.S. Pat. No. 3,172,171 issued to C. E. Knight on Mar. 9, 1965; and U.S. Pat. No. 3,417,651 issued to W. G. Moehlenpah on Dec. 24, 1968. Moreover, attention is directed to U.S. Pat. No. 3,454,292 issued to A. C. Stanford July 8, 1969 in which two plates are used and in which teeth from one plate project through an aperture in the adjacent plate with the adjacent plates being secured together by coaction of teeth of one plate with the restricted aperture in the second plate. However, neither the structure illustrated in Jureit U.S. Pat. No. 3,472,118 or in Stanford U.S. Pat. No. 3,454,292 can be construed as back-to-back welding of two plates each having teeth projecting in opposite directions from adjacent plates. Moreover, the connector shown in the Sanford patent utilizes a bayonet and anchor plate construction completely dissimilar from the subject connector. Attention is also drawn to U.S. Pat. No. 3,480,305 issued to W. F. Jureit on Nov. 25, 1969 where back-to-back plates are placed inbetween two structural members with a bolt running therethrough joining the structural members. However, in this patent the toothed plates are not interlocked or secured one to the other, but are for reinforcement. Thus the plates are not used for joining or securing of one structural member to another. This function is provided by the bolt.

Moreover, none of the aforementioned patents utilize the teeth arrangement described herein nor do they utilize the misalignment principle described.

It is accordingly an object of this invention to provide a novel and improved method and apparatus for the joining of wooden members.

It is also an object of this invention to provide a low cost method and apparatus for furniture fabrication.

It is a further object of this invention to provide a novel and improved connector for the joining of wooden structural members utilizing a back-to-back pair of connectors from which depend nail-like teeth in opposite directions from opposite sides of the assembly.

It is yet another object of this invention to provide a novel and improved method for connecting structural members in which a novel intermediate hidden fastener is placed between the structural members and the structural members compressed thereon, the provision of the novel intermediate hidden fastener providing the joint formed thereby with exceptional strength and resistance to shear and transverse forces even with surfaces of limited contacting areas.

These and other objects and advantages will become more readily apparent with reference to the following specification, appended claims and drawings wherein:

FIG. 1 is a cross-sectional view of a connector assembly constructed in accordance with the present invention;

FIG. 2 is a perspective view of a portion of the subject connector illustrating the back-to-back arrangement and the misalignment of the slots produced in both plates when the teeth are struck therefrom;

FIG. 3 is a perspective view of the plate of FIG. 2 illustrating the formation of weldment within the slots of the upper plate;

FIG. 4 is a cross-sectional view of a joint and connector assembly illustrating the hidden fastener in place; and FIG. 5 is a view similar to FIG. 4 illustrating a further form of hidden fastener.

Referring now to the drawings, particularly to FIGS. 1–3, the connector assembly is shown generally indicated at 10. Connector assembly 10 is comprised of a top plate 12 and a bottom plate 14 which are secured one to the other prior to forming a joint. Each of the connector plates is a sheet metal plate having struck therefrom a plurality of longitudinal rows of slender, elongated naillike teeth 16 which leave longitudinal rows of elongated slots 18 as illustrated in FIG. 2. Teeth 16 depend outwardly on opposite sides of the connector assembly and are embedded in the wooden member to be joined in any suitable manner but preferably by the application of pressure between the structural members to be joined as by a suitable press.

In one embodiment teeth 16 in each longitudinal row are struck in the same direction so that the slots 18 which are left extend from the teeth in the same direction while teeth 16 in next adjacent rows are struck in an opposite direction such that the slots in adjacent longitudinal rows extend from the teeth in opposite directions. Each tooth 16, in one embodiment, is generally V-shaped in cross section and has a generally concave punch face 20 and a generally convex back-face 22. The teeth in plates 12 and 14 are arranged in preferably repeating patterns of four rows of teeth and slots transversely across the plate. Selected teeth of the innermost pair of rows of each four-row repeating pattern, terminate in offset pointed ends or tips 24, commonly known as chisel-pointed tips, and the teeth of the outermost longitudinal rows of each four-row repeating pattern terminate in scarfed pointed tips 26.

As can be seen from FIG. 1, selected teeth and preferably the innermost pairs of rows of teeth of each transversely repeating pattern are struck so as to be slightly shorter in length than the teeth forming the outermost pair of rows. In cross section the difference in length can be seen by the difference in length between teeth 16a and 16b. It will be appreciated that each plate has teeth stamped therefrom of different lengths. This particular arrangement of teeth facilitates the embedment of teeth into the wooden members in proper position and it has been found that unusually high insertion pressures are not required. Moreover, the scarfed pointed tips 26 on the outermost rows of teeth are angled such that the teeth tend to converge one towards each other as the teeth are embedded in the wooden member, thereby providing a clinching action which increases withdrawal resistance of the teeth from the wooden member.

According to the present invention, an unusually high ratio of joint strength per unit weight of metal is achieved by the uniqueness of the arrangement of the teeth as well as by the particular configuration of the teeth, whereby relatively thin gauge metal can be employed in most joints.

According to the present invention, in one form thereof, a single lateral shoulder formation 28 on one side of each tooth adjacent the base thereof is provided such that the shoulder formation, in this form, has a linearly extending edge. This shoulder provides each tooth with a widened base portion which provides an increase in the quality of metal at the bent base portion of the tooth in comparison with the quality of the metal which would have been bent if the tooth were struck with a constant width from its base to its tip. By providing teeth shouldered at their bases, the bent metal portions of the teeth provide additional shear and bending strength points therealong and maximum resistance to shear and bending loadings. This feature is important because of the increased strength necessary when the subject connector assembly is utilized in the fabrication of furniture.

Specifically, it has been found that an increase of width of approximately 50 percent of the tooth at its base ultimately increases the overall shear loading which the tooth can withstand at its base and greatly increases the tooth resistance to bending at its base upon insertion of the tooth into wooden members. While increase in tooth width at its base beyond about 50 percent of the width of the tooth may be desirable to provide additional shear strength and resistance to bending, such additional increase in width would result in the reduction of the effective net section and would therefore not be desirable.

Shoulder formation 28 is, in this tooth pattern, preferably right-triangular in shape with the base of the triangle lying closely adjacent the corresponding plate. It will be understood that shoulder formations having other configurations may be employed, for example, an arcuate configuration in which the shoulder arcs upwardly towards the tip.

It is another important feature of the present invention that a flat 29 be provided along the outer edge of shoulder 28. The die, (not shown) used in striking the teeth is configured to cut both the angled shoulder portion and the flat from the plate leaving certain slot edge portions. In this manner, the plate, when cut by the die, is torn for about one-half the thickness of the sheet metal in longitudinal direction. Otherwise, the plate would tear along the line extending diagonally in the plate and substantially in the same direction that the edge of the shoulder 28 extends. If the flat was not provided, possible diagonal fracture or tear would be set up and a loss of net section would be incurred. By providing a longitudinally extending flat, the effects of longitudinal tear in the plate caused by the die is minimized. Diagonal or transverse tear or fracture is not set up, and, most importantly, net section is preserved.

The disposition of shoulder 28 on the teeth relative to the disposition of the adjacent teeth is particularly significant as it is an important factor in maximizing and preserving the net overall section. As can be seen, shoulders 28 are formed on the inner side of the outermost rows of teeth, and shoulders are formed on the inner sides of the innermost longitudinal rows of teeth. Teeth 16 in each row, are, however, longitudinally displaced from the corresponding teeth in the next adjacent rows, thus arranging the teeth in each row in staggered relation to corresponding teeth in next adjacent rows. The staggering provides that the slots left by the widened base portions of the teeth in each longitudinal row are transversely opposite to reduced slot formations left by the pointed or scarfed ends of the teeth in the next adjacent longitudinal rows of teeth and the metal portion between the ends of longitudinally adjacent slots in such next adjacent longitudinal row. By positioning the widened base portions of the teeth in this manner, the maximum net reduction in width and hence the effective net section across the plate at any one point therealong is substantially equal, and in the preferred embodiment four times the normal slot width. Since the widened base portions are disposed relative to the next adjacent transverse slots to lie opposite the pointed slot formations and the metal portion between the slots, the net section is preserved and will not be reduced to a greater extent than the reduction caused by the width of the shank portion of the slots.

The effective tensile loading which the plate of the present invention can withstand is principally determined by the quality of the metal across the plate and the maximum shear load which the shank portion of the teeth can withstand.

Thus the unusually high and unexpected effective net section in the plate, the high resistance to bending upon insertion of the teeth into members of the joint, the unexpected high shear strength of the joint, and the unexpected high shear strength of the teeth, result in part, from the unique location of the shoulder relative to the teeth and the slot formation left thereby relative to adjacent slot formations.

The arrangement and configuration of the teeth in each plate per se herein described and illustrated has been provided and utilized for many years in individual connector plates.

As mentioned hereinbefore, the two plates are welded together in back-to-back relation for strength. The back-to-back welding of the plates is facilitated by the lateral misalignment between slots in upper plate 12 and lower plate 14.

Referring again to FIG. 1, the misalignment between the slots in plate 12 and the slots in plate 14 can be readily seen. Slots 30 resulting from the striking of teeth in plate 12 are misaligned with slots 32 in plate 14 such that metal portions 34 of plate 14 are exposed through the slots 30 of plate 12.

In the preferred embodiment weldment is formed in selected slots such that a strong weld is formed at a number of points between plate 12 and plate 14. Particularly, weld material is deposited in the slots of one plate and onto the portions of the other plate exposed through the slot openings. The welding procedure is particularly important since the overall strength of the plates depends on the double thickness of plate material and the security of the multi-point joints between the plates. The multi-point welding provides that the load borne by the plates is distributed across both plates. Since the integrity of the joint formed by this fastener is dependent upon the fastness of the joint between the two plates, it is important that good welds be made. Spot-welding and edge welding are practical alternatives to the above-described weldment. Spot-welding provides an extremely strong back-to-back structure in which the already improved net section of the plates is further improved by the welding of the two plates together by weldment positioned in selected slots, with the aforementioned misalignment providing a surface for welding purposes. Thus the strength of the plates is increased sufficiently for the use of this type of hidden fastener in the fabrication of furniture. The joint formed by the hidden fastener is resistant to torsional stress as well as lateral stresses, shearing and tooth extraction with the plates having unusual resistance to fracture due to the back-to-back welded construction.

It will be appreciated that both the welding technique described and the tooth configuration may be altered to suit the particular application. For instance, to provide increased shear strength across the base portions of the teeth, the teeth may be provided with arcuate shoulders along opposite sides of each tooth adjacent the base portions of the teeth. The radiused shoulders optimize resistance to bending of the tooth upon embedment in a wooden member. More particularly, the radiused shoulders provide a gradual increase in the press tonnage required to embed the shoulders into the wood. This is particularly advantageous where a toggle press (not shown) is employed in which maximum tonnage is applied near the bottom of the toggle press stroke. Moreover, the radiused shoulders tend to gradually wedge and separate the wood fibers upon insertion rather than cutting of the fibers. This provides a greater resistance to withdrawal. As described hereinbefore, the additional metal provided at the base portions of the teeth by the radiused shoulders provides the teeth with substantially increased resistance to shear.

Referring to FIG. 5, the plates 12a and 14a have been shifted longitudinally as well as laterally with respect to one another. The rows of teeth formed in the respective plates are thus transversely aligned one with the other.

Moreover, as illustrated in copending application Ser. No. 815,453, and assigned to the assignee hereof, a wagon tracked tooth cross-section may be provided in which the teeth are substantially reinforced in an axial direction.

Additionally it is possible to maintain the required net section between adjacent rows of teeth by forming the short side of the scarfed tooth tips to a concave surface. Not only is the net section preserved, but the formation of the concavity on the one side of the scarfed pointed tooth facilitates embedment of the teeth into the wood by separating the wood fibers rather than cutting them. The teeth may also be provided with a plurality of shoulders formed along opposite edges of the tooth so as to provide further gripping surfaces on the edges of each tooth for resistance to withdrawal. The shoulders forming gripping surfaces may be sloped so as to permit ease of embedment and resistance to withdrawal.

Referring to FIG. 4 a joint including two wooden members 38 and 40 is illustrated as being joined by connector assembly 10. The hidden fastener function can clearly be seen in this Figure, with the fastener being hidden from view by the members to be joined. As can be seen, the back-to-back plate assembly is embedded in both wooden structural members so as to form a laminated or abutting joint. It will be appreciated that in the manufacturing of furniture the hidden fastener may be used without adhesives or with adhesives, as desired.

While the subject hidden fastener connector plate assembly has been described in connection with the manufacture of furniture, it will be appreciated that hidden fasteners of this type have utility wherever unusual joint stability is required and wherever there is a limited contact area in which to embed the fastener. What has therefore been provided is a hidden fastener which is resistant to shear and torsional stresses as well as to withdrawal of teeth.

In the preferred embodiment the net section of the plates used with the fasteners is increased not only by the tooth arrangement but also by the back-to-back securing of one plate to the other at a number of points. Additionally, the aforementioned misalignment provides a convenient and substantially better welding method by which two plates can be joined. There has also been provided a new method of manufacturing furniture in which a hidden fastener of the type described is utilized either along or in combination with adhesives in the formation of the furniture joints. Moreover, the subject hidden fastener can be utilized to add even further structural stability to furniture made in the conventional manner by preventing the working of the furniture from loosening the joints.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A hidden fastener comprising:
two metallic plates, each of said plates having rows of teeth struck therefrom and depending outwardly from the plate, said teeth being at longitudinally spaced positions along the plate with slots left by the striking of said teeth extending away from the base of said teeth, said plates being bonded together in back-to-back relation with teeth extending from said plates in opposite directions.

2. The hidden fastener according to claim 1 wherein the slots in one of said plates is misaligned with the slots in the other of said plates thereby to expose metal in one plate through slots in the other plate; and further including material coacting with the material surrounding a slot in one plate and with the metal of the other plate exposed in said slot for securing one plate to the other.

3. The hidden fastener according to claim 2, wherein said plates are welded together and wherein said material is weldment.

4. The hidden fastener according to claim 1 wherein all of said teeth include a shoulder portion at the base thereof, wherein selected teeth include scarfed points and selected teeth include chisel points, teeth in adjacent rows being staggered such that the slots left by said shoulders in one row of teeth lie adjacent metal between adjacent teeth in an adjacent row.

5. A connector assembly comprising:
back-to-back welded metal plates, each of said plates having rows of teeth struck therefrom and depending outwardly from each plate, selected teeth having scarfed tips, the remainder having chisel-pointed tips, said teeth being at longitudinally spaced positions along each plate with slots left by the striking of said teeth extending away from the base of said teeth, the slots in one plate being misaligned with the slots in the other plate such that metal from one plate is exposed in the slots of the other plate, said plates being welded together by the introduction of weldment in selected slots such that said plates are secured together in back-to-back relationship with teeth extending from said plates in opposite directions, each of said teeth having a widened base portion, said teeth being staggered such that the enlarged slot portions left by the striking of the widened base portions lie adjacent the metal between adjacent teeth in an adjacent row.

6. The connector assembly according to claim 5 wherein said teeth are arranged in repeating rows of four, the outermost rows having scarf-pointed teeth arranged such that when said teeth are embedded in a wooden structural member, the embedment forces the teeth in outside rows together, thereby to provide a clinching action to prevent against tooth withdrawal.

7. The connector assembly according to claim 5 wherein said widened base portions include a shoulder portion to one side of each tooth.

8. The connector assembly according to claim 7 wherein said shoulder portion includes a flat portion parallel to one edge of its corresponding tooth.

9. The connector assembly according to claim 7 wherein said shoulders are radiused.

10. The connector assembly according to claim 5 wherein each of said teeth has a V-shaped cross-section.

11. The connector assembly according to claim 5 wherein each of said teeth has a wagon track cross-section.

12. The connector assembly according to claim 5 wherein the tips of each tooth are provided with a concave cutting surface.

13. The connector assembly according to claim 5 wherein selected teeth are shorter than the remaining teeth thereby to permit joint formation with reduced pressures.

* * * * *